Aug. 18, 1959      O. C. ECKEL      2,900,102

HOLDING MEMBER FOR INSULATING CLIPS

Filed Jan. 26, 1954

INVENTOR.
Oliver C. Eckel
BY Harold E. Cole
Attorney

United States Patent Office 2,900,102
Patented Aug. 18, 1959

2,900,102

HOLDING MEMBER FOR INSULATING CLIPS

Oliver C. Eckel, Boxborough, Mass.

Application January 26, 1954, Serial No. 406,193

2 Claims. (Cl. 220—9)

This invention relates to a holding member for insulating clips and the like, for attachment to the outside of a container or duct.

In some instances, containers, air ducts and other hollow bodies are kept so hot that it is difficult to keep in place the clips or pins that hold insulation which surrounds the hollow bodies. A tank, for example, may contain a hot liquid, and the adhesive that holds insulation clips or pins on the outside surface of the tank may dry out, thus allowing the clip to drop off, carrying the insulation with it. To solve this problem I provide a holder or band that extends all the way around a tank or other container, or, in some instances part way around. This holder is provided with openings, such as slots or holes, through which insulation-holding clips extend, their bases or flat ends being on one side of the holder next to the tank and the insulation holding shanks being on the other side. Thus, by securely wrapping or attaching a holder on a container it provides the support for insulation holding clips or pins or the like, without the use of adhesive or similar holding means.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

As illustrated, a container C may be rectangular or otherwise shaped, in top plan view. It could be a tank holding a liquid, a hot air duct or other body.

Figure 3:
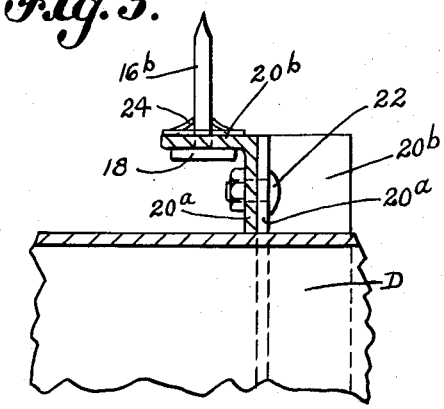
Figure 3 is an enlarged, sectional view taken on the line 3—3 of Figure 1.

As illustrated, I show a holding member to extend around a duct D or other body that is rectangular in cross-section or is otherwise non-circular, with straight sides. This holding member is formed of separate angle sections which preferably are right-angled in cross section as best shown in Figure 3 of the drawings, one part, nearer the duct D, being given the numeral 20a and the other 20b. These sections are fastened together as by bolts 22 extending through two of said angular parts 20a at the corners where two sections meet and overlap.

Said parts 20b have slots 14a and holes 14b therein through which forked and nail type shanks 16a and 16b respectively of clips to hold insulation extend, the latter being retained there by well known retainers 24 by friction fit or cement, as desired, in the case of the nail type 16b. The forked portions are bent over if the clips have said shanks 16a. Said clips are spaced from said duct D because said angular parts 20b are so spaced and each has a base 18 that is inwardly of said angle section 20b in position of use.

In assembling said angular sections they are laid against the duct D with said angular parts 20a overlapping at the corners where they are bolted together. Said clips are then in position on said sections, ready to receive the insulation as aforesaid.

Figure 1:
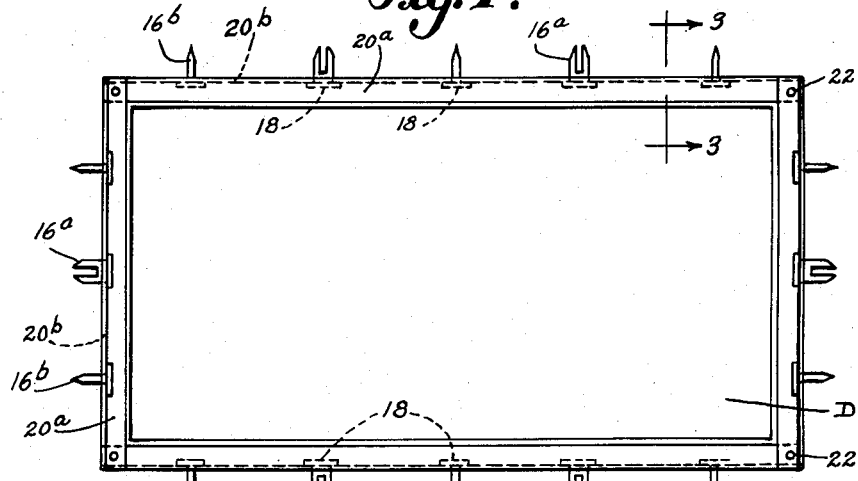
Figure 1 is an end elevational view of a holding member with clips and pins, said member being attached to a rectangularly-shaped duct, the holding member being shown in sections fastened together at four corners.
Figure 2:
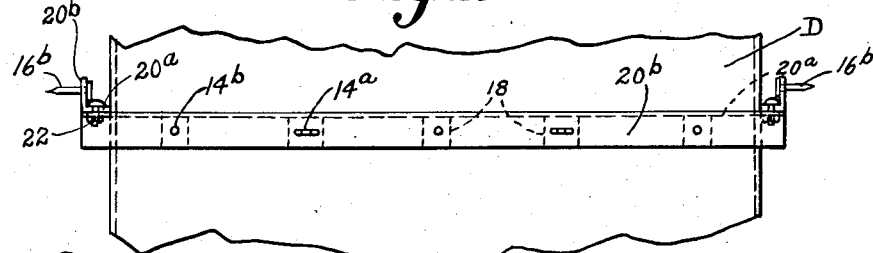
Figure 2 is a side elevational view of the assembly shown in Figure 1, the container being shown broken away.

While I have shown clips with forked shanks and pin shanks in Figure 1 of the drawings for illustration, ordinarily only one type of clip would be used for a single installation; but slots 14a and the holes 14b are provided in a holding member as it is not always known ahead which type of clip shank will be used.

What I claim is:

1. A holding member in combination with a container having a plurality of straight sides extending angularly to each other, said holding member embodying a plurality of straight sections surrounding said container, means to attach said sections together at their ends, each said section embodying in cross section a part spaced from and parallel to a container side and having holes therethrough, clips embodying shank portions and base portions, said shank portions extending through said holes, said base portions being too large to extend therethrough, each said section embodying another part at an angle to said first part in contact with the exterior surface of said container.

2. A holding member in combination with a container having a plurality of straight sides extending angularly to each other, said holding member embodying a plurality of straight sections surounding said container, each said section embodying a portion in contact with said container and a portion spaced outwardly from said container, means attaching said contacting portions together at their ends beyond said container, each said section having holes therethrough that are opposite said container, clips embodying shank portions and base portions, said shank portions extending through said holes and said base portions being too large to extend therethrough.

References Cited in the file of this patent

UNITED STATES PATENTS

| 102,370 | Cary | Apr. 26, 1870 |
| 162,184 | McGill | Apr. 20, 1875 |
| 174,114 | Bryan | Feb. 29, 1876 |
| 513,322 | Hart | Jan. 23, 1894 |
| 1,164,152 | Wolf | Dec. 14, 1915 |
| 1,705,895 | Blair | Mar. 19, 1929 |
| 1,819,752 | Maull | Aug. 18, 1931 |
| 1,955,443 | Spafford | Apr. 17, 1934 |
| 2,243,427 | Kleffel | May 27, 1941 |
| 2,365,629 | Eckel | Dec. 19, 1944 |
| 2,405,912 | Tinnerman | Aug. 13, 1946 |
| 2,439,806 | Heinenman | Apr. 20, 1948 |
| 2,656,902 | Gotshall | Oct. 27, 1953 |

FOREIGN PATENTS

| 42,278 | Denmark | May 19, 1930 |
| 19,123 | Great Britain | of 1893 |